United States Patent
Oya

(10) Patent No.: US 8,400,303 B2
(45) Date of Patent: Mar. 19, 2013

(54) INFORMATION PROCESSING SYSTEM, INFORMATION PROCESSING DEVICE, AND INFORMATION PROCESSING METHOD

(75) Inventor: Taku Oya, Moriyama (JP)

(73) Assignee: Omron Automotive Electronics Co., Ltd., Achi (JP)

( * ) Notice: Subject to any disclaimer, the term of this patent is extended or adjusted under 35 U.S.C. 154(b) by 507 days.

(21) Appl. No.: 12/711,996

(22) Filed: Feb. 24, 2010

(65) Prior Publication Data

US 2010/0231369 A1    Sep. 16, 2010

(30) Foreign Application Priority Data

Mar. 11, 2009   (JP) .................................. 2009-058232

(51) Int. Cl.
*H04Q 1/00*    (2006.01)
*G08B 23/00*   (2006.01)
*G08B 1/08*    (2006.01)
*B60R 25/10*   (2006.01)

(52) U.S. Cl. ............. 340/572.1; 340/539.1; 340/539.11; 340/426.14; 340/426.16; 340/426.17; 340/5.1; 340/5.2; 340/5.6; 340/5.64; 340/5.65; 340/5.8

(58) Field of Classification Search ........................ None
See application file for complete search history.

(56) References Cited

U.S. PATENT DOCUMENTS

| | | | |
|---|---|---|---|
| 7,304,564 B2 * | 12/2007 | Yang et al. | 340/426.13 |
| 2006/0197677 A1 * | 9/2006 | Watanabe et al. | 340/825.72 |
| 2007/0216517 A1 * | 9/2007 | Kurpinski et al. | 340/5.72 |
| 2009/0243791 A1 * | 10/2009 | Partin et al. | 340/5.2 |
| 2010/0039215 A1 * | 2/2010 | Proefke et al. | 340/5.1 |

FOREIGN PATENT DOCUMENTS

JP    2004-352053 A    12/2004

* cited by examiner

*Primary Examiner* — Julie Lieu
(74) *Attorney, Agent, or Firm* — Osha Liang LLP

(57) ABSTRACT

An information processing system includes an information processing device arranged in a vehicle, a portable device storing unique information, a specification information recording unit configured to record specification information having a predetermined relationship with the unique information, a first transmission unit configured to transmit a request signal requesting transmission of the unique information, a first reception unit configured to receive the unique information transmitted from the portable device, a position specifying unit configured to compare the received unique information with the specification information and specify whether or not the portable device is inside the vehicle, a detection unit configured to detect a human inside the vehicle, an alarm unit configured to set off an alarm, and an alarm control unit.

11 Claims, 4 Drawing Sheets

FIG. 2

|  | PORTABLE DEVICE IN VEHICLE | PORTABLE DEVICE NOT IN VEHICLE |
|---|---|---|
| HUMAN IN VEHICLE | DO NOT SET OFF ALARM | NO ALARM IF HUMAN IS DETECTED WITHIN CONSTANT TIME AFTER PORTABLE DEVICE IS BROUGHT OUT |
| HUMAN NOT IN VEHICLE | SET OFF ALARM | SET OFF ALARM |

INFORMATION PROCESSING SYSTEM, INFORMATION PROCESSING DEVICE, AND INFORMATION PROCESSING METHOD

BACKGROUND OF THE INVENTION

1. Technical Field

The present invention relates to information processing systems, information processing devices, and information processing methods, and in particular, to an information processing system, an information processing device, and an information processing method that enhance the convenience in monitoring the bring-out of a portable device to the outside of the vehicle.

2. Related Art

Conventionally, a passive entry system enabling the door of a vehicle to be locked or the engine to be started with a simple operation without requiring a mechanical key when the driver possesses a portable device that wirelessly communicates with the vehicle is known.

Since a third person who broke into the vehicle can drive the vehicle without carrying the portable device if the driver brings out the portable device to the outside of the vehicle while the engine is running, the bring-out of the portable device to the outside of the vehicle is monitored in the passive entry system. In other words, in the passive entry system, the safety (security) is enhanced by setting off an alarm when the portable device is brought out to the outside of the vehicle while the engine is running.

For a technique related to the passive entry system, stopping a communication between the portable device and a controller arranged in the vehicle is proposed when a specific window of the vehicle is closed even when the engine is running (see e.g., Japanese Unexamined Patent Publication No. 2004-352053). In this technique, the wear of the battery can be reduced since the communication is stopped when the specific window is closed and the bring-out of the portable device is not monitored.

SUMMARY

However, in the above-described technique, when an acquaintance of the driver is at the passenger seat etc. of the vehicle even when the portable device is brought out to the outside of the vehicle at the time of monitoring the bring-out of the portable device, an alarm is set off although the possibility the vehicle will be stolen by a third person is low. In such a case, the driver of the vehicle needs to once take out his/her portable device from the bag etc. and leave it in the vehicle, and then go out of the vehicle, which is inconvenient.

One or more embodiments of the present invention enhance the convenience of the vehicle in monitoring the bring-out of the portable device to the outside of the vehicle.

In accordance with one aspect of the present invention, an information processing system includes an information processing device arranged in a vehicle; a portable device storing unique information; a specification information recording unit configured to record specification information having a predetermined relationship with the unique information; a first transmission unit configured to transmit a request signal requesting transmission of the unique information; a first reception unit configured to receive the unique information transmitted from the portable device; a position specifying unit configured to compare the received unique information with the specification information and specify whether or not the portable device is inside the vehicle; a detection unit configured to detect a human inside the vehicle; an alarm unit configured to set off an alarm; and an alarm control unit configured to control the alarm unit so that the alarm is set off when the portable device is not inside the vehicle and the human is not detected inside the vehicle and the alarm is not set off when the human is continuously detected inside the vehicle from when specified that the portable device is not inside the vehicle. The portable device includes a unique information recording unit for recording the unique information; a second reception unit for receiving the request signal from the information processing device; and a second transmission unit for transmitting the unique information recorded in the unique information recording unit in response to the request.

In one or more embodiments of the information processing system of the present invention, a request signal is transmitted from the information processing device, the request signal is received by the portable device, and the unique information is transmitted from the portable device in response to the request signal. The unique information is received by the information processing device, the unique information and the specification information are compared to specify whether or not the portable device is inside the vehicle, the human inside the vehicle is detected, and the alarm is set off based on the specification result on the portable device and the detection result on the human.

Therefore, when monitoring the bring-out of the portable device to the outside of the vehicle, whether or not to set off the alarm can be more accurately specified from the position of the portable device and the presence of the human, whereby the convenience of the vehicle can be enhanced.

For instance, the specification information recording unit of the information processing device is configured by a memory, the first transmission unit is configured by a transmission unit, and the first reception unit is configured by a reception unit. The position specifying unit of the information processing device is configured by a position specifying portion, the detection unit is configured by a human detecting portion, the alarm unit is configured by a bring-out unit or a break-in alarm unit, and the alarm control unit is configured by a control portion. Furthermore, the unique information recording unit of the portable device is configured by a memory, the second reception unit is configured by a reception unit, and the second transmission unit is configured by a transmission unit.

The alarm control unit may control the alarm unit so that the alarm is set off when specified that the portable device is inside the vehicle and the human is not detected inside the vehicle. The portable device thus can be prevented from being mislaid in the vehicle.

The information processing device may further include a gear lock unit and a steering lock unit for locking a gear and the steering wheel, respectively, of the vehicle when specified that the portable device is not inside the vehicle. The vehicle is thus prevented from being mistakenly driven and the vehicle is also prevented from being stolen. The gear lock unit is configured by a gear lock unit. The steering lock unit is configured by a steering lock unit.

In accordance with another aspect of the present invention, an information processing device is arranged in a vehicle, the information processing device including a specification information recording unit configured to record specification information having a predetermined relationship with unique information recorded in a portable device; a transmission unit configured to transmit a request signal requesting transmission of the unique information; a reception unit configured to receive the unique information transmitted from the portable device in response to the request signal; a position specifying unit configured to compare the received unique information with the specification information and specify whether or not the portable device is inside the vehicle; a detection unit configured to detect a human inside the vehicle; an alarm unit configured to set off an alarm; and an alarm control unit configured to control the alarm unit so that the alarm is set off when the portable device is not inside the vehicle and the human is not detected inside the vehicle and the alarm is not set off when the human is continuously detected inside the vehicle from when specified that the portable device is not inside the vehicle.

In the information processing device, the request signal is transmitted, the unique information transmitted from the portable device in response to the request signal is received, the unique information and the specification information are compared to specify whether or not the portable device is inside the vehicle, the human inside the vehicle is detected, and the alarm is set off based on the specification result on the portable device and the detection result on the human.

Therefore, when monitoring the bring-out of the portable device to the outside of the vehicle, whether or not to set off the alarm can be more accurately specified from the position of the portable device and the presence of the human, whereby the convenience of the vehicle can be enhanced.

For instance, the specification information recording unit is configured by a memory, the transmission unit is configured by a transmission unit, and the reception unit is configured by a reception unit. The position specifying unit is configured by a position specifying portion, the detection unit is configured by a human detecting portion, the alarm unit is configured by a bring-out unit or a break-in alarm unit, and the alarm control unit is configured by a control portion.

In accordance with still another aspect of the present invention, an information processing method of an information processing device is arranged in a vehicle, the method including recording specification information having a predetermined relationship with unique information recorded in a portable device; transmitting a request signal requesting transmission of the unique information; receiving the unique information transmitted from the portable device in response to the request signal; comparing the received unique information with the specification information and specifying whether or not the portable device is inside the vehicle; detecting a human inside the vehicle; and controlling an alarm so that the alarm is set off when the portable device is not inside the vehicle and the human is not detected inside the vehicle and the alarm is not set off when the human is continuously detected inside the vehicle from when specified that the portable device is not inside the vehicle.

In the information processing method, the request signal is transmitted, the unique information transmitted from the portable device in response to the request signal is received, the unique information and the specification information are compared to specify whether or not the portable device is inside the vehicle, the human inside the vehicle is detected, and the alarm is set off based on the specification result on the portable device and the detection result on the human.

Therefore, when monitoring the bring-out of the portable device to the outside of the vehicle, whether or not to set off the alarm can be more accurately specified from the position of the portable device and the presence of the human, whereby the convenience of the vehicle can be enhanced.

According to one or more embodiments of the present invention, the bring-out of the portable device to the outside of the vehicle can be monitored. In particular, according to one or more embodiments of the present invention, the convenience of the user can be enhanced in monitoring the bring-out of the portable device to the outside of the vehicle.

BRIEF DESCRIPTION OF THE DRAWINGS

FIG. 2 is a view describing the necessity of an alarm with respect to presence of human and portable device inside the vehicle;

DETAILED DESCRIPTION

Hereinafter, embodiments applied with the present invention will be described with reference to the drawings.

Figure 1:
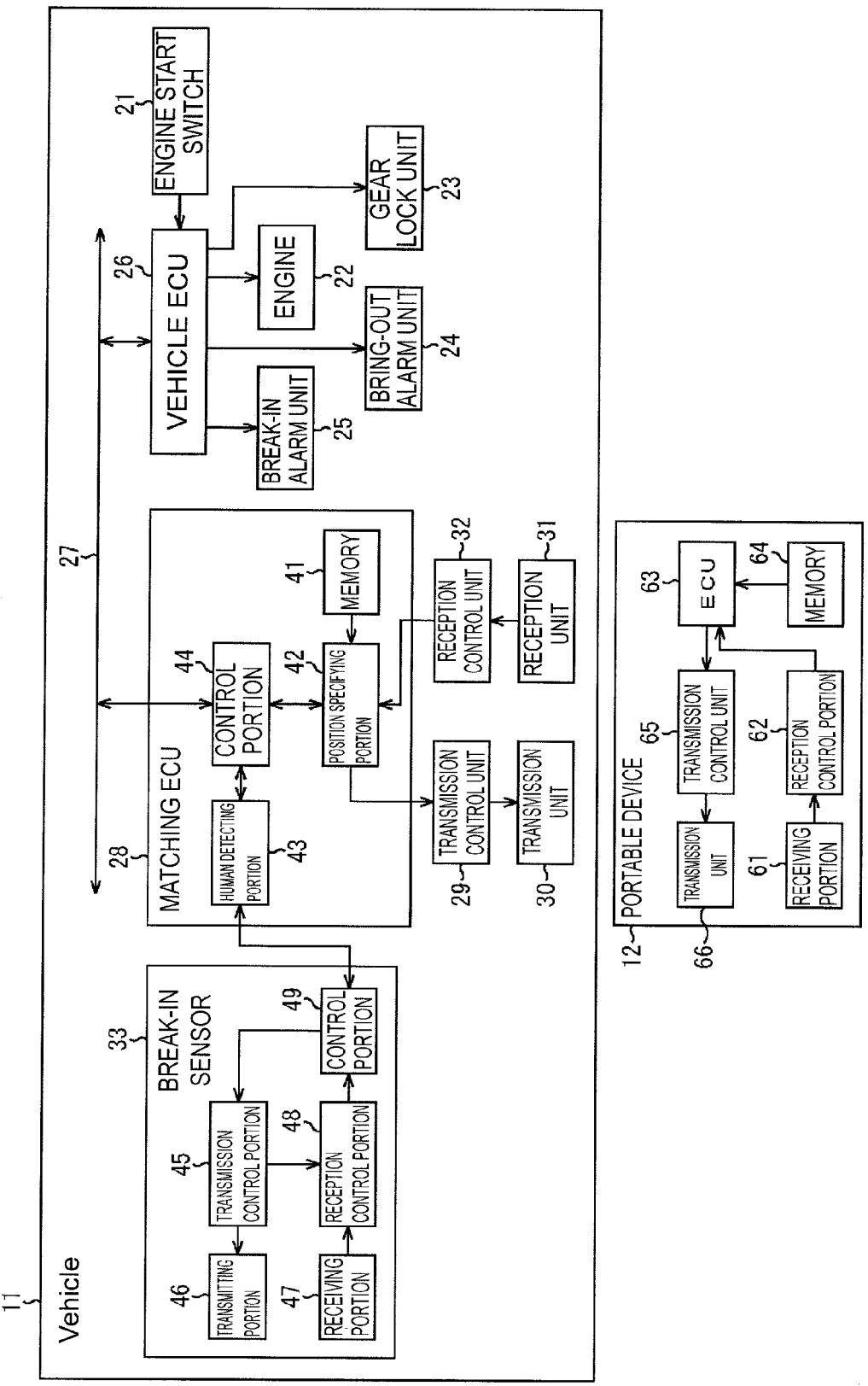
FIG. 1 is a view showing a configuration example of one embodiment of a wireless communication system applied with the present invention.

FIG. 1 is a view showing a configuration example of one embodiment of a wireless communication system applied with the present invention. The wireless communication system includes a vehicle 11 and a portable device 12.

The driver of the vehicle 11 possesses the portable device 12 called FOB etc., and appropriately operates the buttons and switches on the vehicle 11 to lock or unlock the door of the vehicle 11, to startup the engine, and the like.

The vehicle 11 specifies the position of the portable device 12 through wireless communication with the portable device 12, and performs the operations instructed by the driver and the like such as locking the door of the vehicle 11 and starting the engine according to the determination result. While the engine is running, the vehicle 11 specifies the position of the portable device 12 through the wireless communication with the portable device 12, and appropriately sets off an alarm with respect to the bring-out of the portable device 12 when the portable device 12 is brought out to the outside of the vehicle 11.

The vehicle 11 is configured by an engine start switch 21, an engine 22, a gear lock unit 23, a bring-out alarm unit 24, a break-in alarm unit 25, a vehicle ECU (Electronic Control Unit) 26, a bus 27, a matching ECU 28, a transmission control unit 29, a transmission unit 30, a reception unit 31, a reception control unit 32, and a break-in sensor 33.

The engine start switch 21 is operated by the driver and the like when starting up the engine or when supplying power to electric components in the vehicle 11. When operated, the engine start switch 21 provides a signal indicating that it has been operated to the vehicle ECU 26.

The engine 22 is driven by the control of the vehicle ECU 26, and travels the vehicle 11. The gear lock unit 23 locks a gear of the vehicle 11 according to the control of the vehicle ECU 26.

The bring-out alarm unit 24 includes a speaker, a liquid crystal display panel, and the like, and sets off an alarm with respect to the bring-out etc. of the portable device 12 to the outside of the vehicle 11 by the control of the vehicle ECU 26. The break-in alarm unit 25 includes a speaker and the like, and sets off an alarm with respect to the break-in of the third person into the vehicle 11 by the control of the vehicle ECU 26.

The vehicle ECU 26 is connected with the matching ECU 28 through the bus 27, and starts up the engine 22 in response to a signal from the engine start switch 21, or controls the operations of the gear lock unit 23 to the break-in alarm unit 25 according to an instruction from the matching ECU 28.

The matching ECU 28 specifies the position of the portable device 12 based on the signal transmitted from the portable device 12, and instructs the vehicle ECU 26 an alarm on the bring-out of the portable device 12 and the break-in of the third person from the specification result and the detection result on a human inside the vehicle 11 by the break-in sensor 33.

The matching ECU 28 is configured by a memory 41, a position specifying portion 42, a human detecting portion 43, and a control portion 44.

The memory 41 stores a vehicle ID unique to the vehicle 11 as the specification information for specifying the vehicle 11. The position specifying portion 42 instructs the transmission control unit 29 to transmit a request signal, or specifies the position of the portable device 12 by comparing the vehicle ID contained in an answer signal provided from the reception control unit 32 with the vehicle ID recorded in the memory 41.

The request signal refers to a signal that requests for the transmission of the vehicle ID to be transmitted from the vehicle 11, and the answer signal refers to a signal containing the vehicle ID transmitted from the portable device 12 in response to the request by the request signal.

The legitimate portable device 12 corresponding to the vehicle 11 stores the vehicle ID same as the vehicle ID recorded in the memory 41 of the vehicle 11, and the answer signal from the portable device 12 includes the vehicle ID recorded in the portable device 12. The request signal is transmitted at a power intensity that can be received only by a device inside the vehicle 11.

Therefore, the position specifying portion 42 can specify the position of the legitimate portable device 12 with respect to the vehicle 11, that is, whether or not the portable device 12 is inside the vehicle 11 by comparing the vehicle ID contained in the answer signal transmitted from the portable device 12 with the vehicle ID of the memory 41. The position specifying portion 42 provides the specification result on the position of the portable device 12 to the control portion 44.

The human detecting portion 43 detects whether or not a human is inside the vehicle 11 based on the signal provided from the break-in sensor 33, and provides the detection result to the control portion 44. The control portion 44 controls the entire matching ECU 28. The control portion 44 instructs the vehicle ECU 26 an alarm on the bring-out of the portable device 12 and the break-in of the third person based on the specification result from the position specifying portion 42 and the detection result from the human detecting portion 43.

The transmission control unit 29 modulates a carrier wave according to an instruction from the position specifying portion 42 to obtain a request signal, and transmits the request signal from the transmission unit 30. The transmission unit 30 includes an antenna arranged near the steering wheel in the vehicle compartment of the vehicle 11, and wirelessly transmits the request signal provided from the transmission control unit 29.

The reception unit 31 includes an antenna arranged near the steering wheel of the vehicle compartment of the vehicle 11, and receives the answer signal transmitted from the portable 12 and provides the same to the reception control unit 32. The reception control unit 32 demodulates the answer signal provided from the reception unit 31 and provides the same to the position specifying portion 42.

The request signal is an electric wave of a frequency band referred to as the LF (Low Frequency), and the answer signal is an electric wave of a frequency band referred to as the UHF (Ultra High Frequency). The antenna configuring the transmission unit 30 and the reception unit 31 may be one or may be in plurals.

The break-in sensor 33 includes a Doppler sensor and the like, and detects humans in the vehicle compartment of the vehicle 11. The break-in sensor 33 is configured by a transmission control portion 45, a transmitting portion 46, a receiving portion 47, a reception control portion 48, and a control portion 49.

The transmission control portion 45 provides an oscillation pulse provided from the control portion 49 to the reception control portion 48, and drives the transmitting portion 46 based on the oscillation pulse. The transmitting portion 46 is driven by the transmission control portion 45, and transmits an ultrasonic wave to the vehicle compartment of the vehicle 11. The ultrasonic wave transmitted from the transmitting portion 46 is reflected by the object surface such as a human or a wall in the vehicle compartment of the vehicle 11 and received by the receiving portion 47.

The receiving portion 47 receives the ultrasonic wave reflected in the vehicle compartment of the vehicle 11, and provides a reception signal corresponding to the received ultrasonic wave to the reception control portion 48. The reception control portion 48 generates a signal (hereinafter referred to as Doppler signal) containing the signal of the Doppler frequency involved in the movement of the object in the vehicle compartment such as the movement of the human and the vibration of the door based on the reception signal from the receiving portion 47 and the oscillation pulse from the transmission control portion 45, and provides the same to the control portion 49.

The control portion 49 provides the oscillation pulse to the transmission control portion 45 according to an instruction from the human detecting portion 43, and provides the Doppler signal from the reception control portion 48 to the human detecting portion 43.

In the vehicle 11, the gear lock unit 23 or the break-in sensor 33 configure an information processing device that performs wireless communication with the portable device 12 and that sets off an alarm with respect to the bring-out of the portable device 12 to the outside of the vehicle compartment and the break-in of the third person to the vehicle compartment.

The portable device 12 is configured by a reception unit 61, a reception control unit 62, an ECU 63, a memory 64, a transmission control unit 65, and a transmission unit 66.

The reception unit 61 includes an antenna and the like, receives the request signal transmitted from the transmission unit 30 of the vehicle 11, and provides the same to the reception control unit 62. The reception control unit 62 demodulates the request signal provided from the reception unit 61, and provides the same to the ECU 63.

The ECU 63 reads out the vehicle ID from the memory 64 and provides the same to the transmission control unit 65 in response to the request signal provided from the reception control unit 62, and instructs the transmission control unit 65 to transmit the answer signal. The memory 64 records the vehicle ID as unique information for specifying the portable device 12, and provides the recorded vehicle ID to the ECU 63.

The transmission control unit 65 modulates the carrier wave based on the vehicle ID provided from the ECU 63 to obtain the answer signal, and provides the answer signal to the transmission unit 66. The transmission unit 66 includes an antenna and the like, and wirelessly transmits the answer signal provided from the transmission control unit 65.

The unique information recorded in the memory 64 has a specific relationship with the specification information recorded in the memory 41, and may be any information as long as the vehicle 11 can authenticate (specify) the portable device 12 based on the unique information. For instance, a unique ID specifying the portable device 12 may be given to the portable device 12 and the unique ID may be recorded in the vehicle 11 as the specification information, so that the unique ID of the portable device 12 and the specification information of the vehicle 11 can be compared.

The unique information may be recorded in the portable device 12, and data in which the unique information is converted through a predetermined algorithm may be recorded in the vehicle 11 as specification information. In such a case, the position specifying portion 42 converts the received unique information of the portable device 12 through a predetermined algorithm, compares the data obtained by conversion with the recorded specification information, and determines whether or not the data and the specification information match.

If the driver brings out the portable device 12 to the outside of the vehicle 11 with the engine 22 of the vehicle 11 running, the third person who broke into the vehicle 11 can drive the vehicle 11 and thus the vehicle 11 may get stolen.

The vehicle 11 thus monitors the bring-out of the portable device 12 from the vehicle 11 while the engine 22 of the vehicle 11 is running, and appropriately sets off an alarm with respect to the bring-out.

In other words, when the portable device 12 is inside the vehicle 11 and the human is also inside the vehicle 11, the vehicle 11 does not set off an alarm with respect to the bring-out of the portable device 12. A case in which the human and the portable device 12 are inside the vehicle 11 includes a case in which the driver drives the vehicle 11 while holding the portable device 12.

The vehicle 11 sets off an alarm with respect to mislaying of the portable device 12 such as when the portable device 12 is inside the vehicle 11 and the human is not inside the vehicle 11. For instance, a case in which the human is not inside the vehicle 11 but the portable device 12 is inside the vehicle 11 includes a case in which the driver forgets the portable device 12 inside the vehicle 11 and gets out of the vehicle 11. In such a case, the vehicle 11 may be stolen by a third person, and thus an alarm is set off with respect to the mislaying of the portable device 12. The portable device 12 thus can be prevented from being mislaid, and the vehicle 11 can be prevented from being stolen.

Furthermore, the vehicle 11 appropriately sets off an alarm with respect to the bring-out of the portable device 12 when the portable device 12 is not inside the vehicle 11 and the human is inside the vehicle 11.

Specifically, if a human is detected inside the vehicle 11 within a predetermined constant time, after the portable device 12 is brought out to the outside of the vehicle 11, determination is made that the human has been inside the vehicle 11 continuously after the portable device 12 is brought out, and the alarm with respect to the bring-out is not set off.

For instance, a case in which a human is detected with a constant time after the portable device 12 is brought out from the vehicle 11, that is, a case in which the human is inside the vehicle 11 from a time point the portable device 12 is brought out includes a case in which the driver gets out of the vehicle 11 with the portable device 12 but an acquaintance of the driver remains at the passenger seat etc. of the vehicle 11. In such a case, the possibility the vehicle 11 will be stolen is low, and thus problems in security do not arise even if the portable device 12 is brought out from the vehicle 11 while the engine 22 is running, and the alarm with respect to the bring-out of the portable device 12 is not set off.

When a human is detected inside the vehicle 11 after elapse of a constant time after the portable device 12 is brought out to the outside of the vehicle 11, that is, when only the human is detected inside the vehicle 11 after elapse of a constant time from a state in which the portable device 12 and the human are not inside the vehicle 11, an alarm with respect to the bring-out of the portable device 12 and an alarm with respect to the break-in of the third person to the vehicle 11 are set off.

For instance, a case in which the human is detected inside the vehicle 11 after elapse of a constant time after the portable device 12 is brought out to the outside of the vehicle 11 includes a case in which the third person breaks into the vehicle 11 after the driver got out of the vehicle 11 with the portable device 12 while the engine 22 is running. In such a case, the vehicle 11 may be stolen, and thus an alarm with respect to the bring-out of the portable device 12 and an alarm with respect to the break-in to the vehicle 11 of the third person are set off.

The vehicle 11 sets off an alarm with respect to the bring-out of the portable device 12 when the portable device 12 is not inside the vehicle 11 and the human is not inside the vehicle 11. A case in which the portable device 12 and the human are not inside the vehicle 11 includes a case in which the driver gets out of the vehicle 11 with the portable device 12 while the engine 22 is running. In such a case, an alarm with respect to the bring-out of the portable device 12 is set off since the vehicle 11 may be stolen.

Therefore, whether or not to set off the alarm is determined based on the specification result on whether the portable device 12 is inside the vehicle 11 and the detection result on the presence of the human inside the vehicle 11, so that whether a state to set off the alarm can be more accurately specified. The security and the convenience of the vehicle 11 thus can be enhanced.

For instance, the alarm will not be set off in a safe state in which the risk of being stolen does not exist such as when the driver gets out of the vehicle 11 with the portable device 12 while leaving an acquaintance in the passenger seat. Thus, the drive does not need to take out the portable device 12 from the bag etc. and leave it in the vehicle 11 every time the drive gets out of the vehicle 11, and the driver can get out of the vehicle 11 with the portable device 12 while the engine 22 running.

Figure 3:
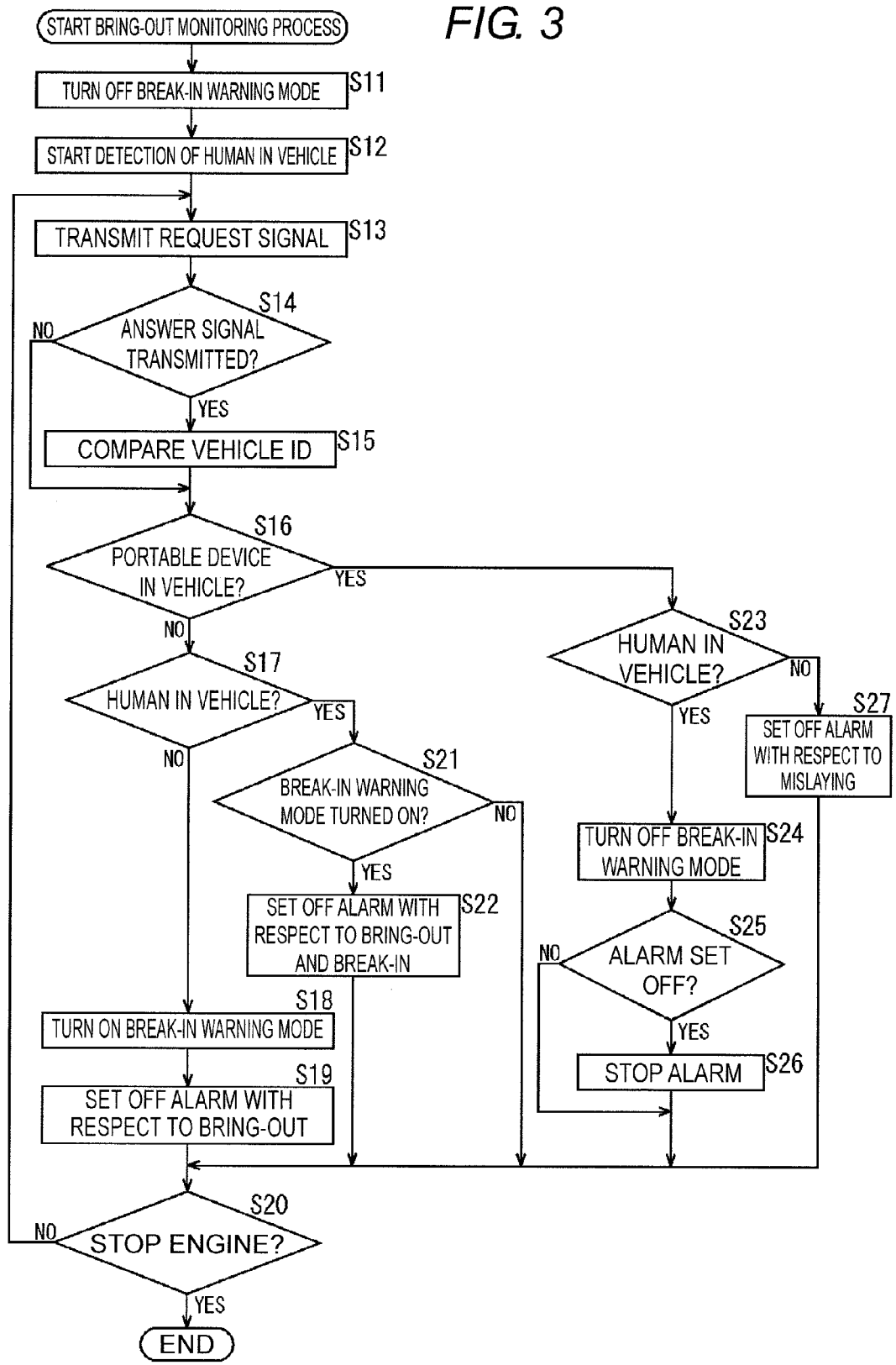
FIG. 3 is a flowchart describing a bring-out monitoring process.

The bring-out monitoring process or a process in which the vehicle monitors the bring-out of the portable device 12 will be described with reference to the flowchart of FIG. 3. The bring-out monitoring process starts when the vehicle ECU 26 starts up the engine 22 according to the operation on the engine start switch 21 by the driver and the like.

In step S11, the control portion 44 turns OFF a break-in warning mode. The break-in warning mode is a mode in which the alarm is set off with respect to the break-in when the break in of the third person to the vehicle 11 is detected, where the alarm is set off when the break-in is detected if the break-in warning mode is turned ON, and the alarm is not set off even when the break-in is detected if the break-in warning mode is turned OFF.

The break-in warning mode is turned OFF when the driver is inside the vehicle 11 and the portable device 12 is also inside the vehicle at the time point the bring-out monitoring process is started, that is, immediately after the engine 22 is started.

When the control portion 44 turns OFF the break-in warning mode, the start of detection of a human inside the vehicle 11 is instructed to the human detecting portion 43. The human detecting portion 43 then controls the control portion 49 according to an instruction from the control portion 44, and causes the break-in sensor 33 to detect the human inside the vehicle 11.

In step S12, the break-in sensor 33 starts the detection of a human inside the vehicle 11 according to the control of the human detecting portion 43.

In other words, the control portion 49 provides the oscillation pulse to the transmission control portion 45 according to the control of the human detecting portion 43. The transmission control portion 45 provides the oscillation pulse provided from the control portion 49 to the reception control portion 48 and drives the transmitting portion 46 based on the oscillation pulse, and causes the transmitting portion 46 to transmit the ultrasonic wave.

The receiving portion 47 receives the ultrasonic wave transmitted from the transmitting portion 46 and reflected by the object inside the vehicle 11, and provides a reception signal corresponding to the received ultrasonic wave to the reception control portion 48. The reception control portion 48 generates a Doppler signal based on the reception signal from the receiving portion 47 and the oscillation pulse from the transmission control portion 45, and provides the same to the control portion 49. The control portion 49 provides the Doppler signal from the reception control portion 48 to the human detecting portion 43.

The Doppler signal is a signal which amplitude, the frequency, and the like change when a moving object is inside the vehicle 11 or when the vehicle 11 itself vibrates. That is, a waveform of the Doppler signal changes. Therefore, the human detecting portion 43 can specify whether or not a human is inside the vehicle 11 based on the change in the waveform of the Doppler signal provided from the control portion 49.

Therefore, a process in which the break-in sensor 33 transmits the ultrasonic wave and provides the Doppler signal obtained by receiving the ultrasonic wave reflected inside the vehicle 11 to the human detecting portion 43 is continuously performed until the bring-out monitoring process is terminated, and the Doppler signal is continuously provided to the human detecting portion 43.

In step S13, the transmission unit 30 transmits the request signal. In other words, the control portion 44 instructs the position specifying portion 42 to specify the position of the portable device 12 at a constant time interval when the bring-out monitoring process is started. The position specifying portion 42 controls the transmission control unit 29 according to the instruction of the control portion 44, and the transmission control unit 29 transmits the request signal from the transmission unit 30 according to the control of the position specifying portion 42.

The request signal is transmitted at the power intensity only the portable device 12 inside the vehicle 11 can receive the request signal. Therefore, the answer signal corresponding to the request by the request signal is transmitted only from the portable device 12 inside the vehicle 11.

If the request signal is transmitted in such manner, the answer signal is transmitted from the portable device 12 if the portable device 12 is inside the vehicle 11, so that the reception unit 31 receives the answer signal transmitted from the portable device 12 and provides the same to the reception control unit 32. The reception control unit 32 demodulates the answer signal from the reception unit 31, and provides the same to the position specifying portion 42.

In step S14, the position specifying portion 42 determines whether or not the answer signal is transmitted. For instance, if the answer signal is provided from the reception control unit 32 to the position specifying portion 42 within a predetermined time from when the request signal is transmitted, determination is made that the answer signal is transmitted.

The process proceeds to step S16 if determined that the answer signal is not transmitted in step S14.

If determined that the answer signal is transmitted in step S14, the position specifying portion 42 compares the vehicle IDs contained in the answer signal provided from the reception control unit 32 with the vehicle ID recorded in the memory 41 in step S15.

If determined that the answer signal is not transmitted in step S14 or the vehicle IDs are compared in step S15, the position specifying portion 42 determines whether or not the portable device 12 is inside the vehicle 11 in step S16.

For instance, the position specifying portion 42 determines that the legitimate portable device 12 with respect to the vehicle 11 is inside the vehicle 11 if the vehicle IDs compared in the process of step S15, that is, the vehicle ID contained in the answer signal and the vehicle ID recorded in the memory 41 match. Furthermore, if the vehicle IDs compared in the process of step S15 do not match and the answer signal is not transmitted from the portable device 12, the position specifying portion 42 determines that the portable device 12 is not inside the vehicle 11. The position specifying portion 42 provides the determination result on whether or not the portable device 12 is inside the vehicle 11, that is, the specification result on the position of the portable device 12 to the control portion 44.

If determined that the portable device 12 is not inside the vehicle in step S16, the human detecting portion 43 determines whether or not a human is inside the vehicle 11 based on the Doppler signal provided from the control portion 49 in step S17.

For instance, the human detecting portion 43 detects the movement of a human inside the vehicle 11 by the waveform itself of the Doppler signal, a continuation time of the change in waveform, the frequency of the Doppler signal, and the like, and specifies that the human is inside the vehicle 11. In this case, the movement of the human inside the vehicle 11, the vibration of the vehicle 11 itself, the movement of the human outside the vehicle 11, and the like are distinguished by the changing manner of the waveform of the Doppler signal, the magnitude of the amplitude, and the like.

The human detecting portion 43 provides the determination result on whether or not the human is inside the vehicle 11, that is, the detection result on the human inside the vehicle 11 to the control portion 44.

If determined that the human is not inside the vehicle 11 in step S17, the control portion 44 turns ON the break-in warning mode in step S18. The control portion 44 instructs the vehicle ECU 26 an alarm on the bring-out of the portable device 12 to the outside of the vehicle 11 through the bus 27, and the vehicle ECU 26 controls the bring-out alarm unit 24 according to the instruction.

In step S19, the bring-out alarm unit 24 sets off an alarm with respect to the bring-out of the portable device 12 to the outside of the vehicle 11 according to the control of the vehicle ECU 26. For instance, the bring-out alarm unit 24 displays a warning message with respect to the bring-out of the portable device 12 on the liquid crystal display panel, or outputs an audio of the message from the speaker.

If neither the portable device 12 nor the human is inside the vehicle 11, this means that the human who was inside the vehicle 11 got out of the vehicle 11 with the portable device 12 while the engine 22 is running, that is, a state in which the vehicle 11 can be easily stolen. Therefore, the alarm is desirably set off to prevent the vehicle 11 from being stolen.

If a human not possessing the portable device 12 gets into the vehicle 11 after a state in which neither the portable device 12 nor the human is inside the vehicle 11, such human is possibly a third person different from the owner of the vehicle 11. Therefore, if the break-in of the third person to the vehicle 11 is detected, the alarm is desirably set off with respect to such break-in.

The control portion 44 turns ON the break-in warning mode and gives an alarm with respect to the bring-out of the portable device 12 so that the alarm is set off when the third person breaks into the vehicle 11 when a state in which neither the portable device 12 nor the human is inside the vehicle 11 is realized.

After the alarm with respect to the bring-out is set off, the process proceeds from step S19 to step S20.

In step S20, the vehicle ECU 26 determines whether or not to stop the engine 22. For instance, when the engine start switch 21 is operated to stop the engine 22, and a signal corresponding to the operation is provided from the engine start switch 21 to the vehicle ECU 26, determination is made to stop the engine 22.

If determined not to stop the engine 22 in step S20, the process of monitoring the bring-out of the portable device 12 is continuously performed, and thus the process returns to step S13 and the above-described processes are repeated.

If determined to stop the engine 22 in step S20, the vehicle ECU 26 controls the engine 22 and stops the engine 22, and each unit of the vehicle 11 terminates the performing process, whereby the bring-out monitoring process is terminated.

If determined that the human is inside the vehicle 11 in step S17, the control portion 44 determines whether or not the break-in warning mode is turned ON in step S21.

If determined that the break-in warning mode is turned ON in step S21, the control portion 44 instructs the vehicle ECU 26 an alarm on the bring-out of the portable device 12 to the outside of the vehicle 11 and the break-in of the third person to the vehicle 11 through the bus 27. The vehicle ECU 26 controls the bring-out alarm unit 24 and the break-in alarm unit 25 according to the instruction, and the process proceeds to step S22.

In step S22, the bring-out alarm unit 24 sets off an alarm with respect to the bring-out of the portable device 12 to the outside of the vehicle 11 according to the control of the vehicle ECU 26, and the break-in alarm unit 25 sets off an alarm with respect to the break-in of the third person to the vehicle 11 according to the control of the vehicle ECU 26. For instance, the break-in alarm unit 25 outputs an audio of a message notifying the break-in of the third person from the speaker.

When the portable device 12 is not inside the vehicle 11 but a human is inside the vehicle 11 and the break-in warning mode is turned ON, this means that a human entered the vehicle 11 after a state in which the portable device 12 is once brought out from the vehicle 11 and the human is not inside the vehicle. In such a case, the human who entered the vehicle 11 has a possibility of being the third person unacquainted to the driver and the like, and that the vehicle 11 may be stolen by the third person since the engine 22 is running in the vehicle 11.

When a state in which the portable device 12 is not inside the vehicle 11 but the human is inside the vehicle 11 is realized while the break-in warning mode is turned ON, the control unit 44 sets off the alarm with respect to the bring-out of the portable device 12 and sets off the alarm with respect to the break-in of the human to the vehicle 11 thereby preventing the vehicle 11 from being stolen.

Therefore, when the alarm is set off with respect to the bring-out of the portable device 12 and the break-in of the third person, the process thereafter proceeds to step S20, and the above-described processes are repeated.

If determined that the break-in warning mode is not turned ON in step S21, that is, if the break-in warning mode is turned OFF, the process proceeds to step S20, and the above-described processes are repeated.

In other words, when the portable device 12 is not inside the vehicle 11 but a human is inside the vehicle 11 and the break-in warning mode is turned OFF, this means that a human is continuously in the vehicle 11 from when the portable device 12 is brought out from the vehicle 11. In such a case, the human inside the vehicle 11 is assumed as an acquaintance of the driver, and thus the possibility of the vehicle 11 being stolen is low and the alarm is not set off with respect to the bring-out of the portable device 12.

If determined that the portable device 12 is inside the vehicle 11 in step S16, the human detecting portion 43 determines whether or not a human is inside the vehicle 11 based on the Doppler signal provided from the control portion 49 in step S23. The human detecting portion 43 provides the determination result on whether or not the human is inside the vehicle 11, that is, the detection result on the human inside the vehicle to the control portion 44.

If determined that the human is inside the vehicle 11 in step S23, the control portion 44 turns OFF the break-in warning mode in step S24. In step S25, the control portion 44 determines whether or not the alarm is set off by the bring-out alarm unit 24 or the break-out alarm unit 25.

If determined that the alarm is not set off in step S25, the process proceeds to step S20, and the above-described processes are repeated.

If determined that the alarm is set off in step S25, the control portion 44 instructs the vehicle ECU 26 to stop the alarm through the bus 27. The vehicle ECU 26 then controls the bring-out alarm unit 24 or the break-in alarm unit 25 according to the instruction, and the process proceeds to step S26.

In step S26, the bring-out alarm unit 24 or the break-in alarm unit 25 stops the alarm according to the control of the vehicle ECU 26. For instance, if the alarm is set off by both the bring-out alarm unit 24 and the break-in alarm unit 25, both alarms are stopped.

After the alarm is stopped, the process proceeds to step S20, and the above-described processes are repeated.

When the portable device 12 is inside the vehicle 11 and the human is also inside the vehicle 11, this means that the legitimate driver and the like possessing the portable device 12 is inside the vehicle 11. In such a case, the possibility the vehicle 11 will be stolen by the third person is small, and thus the break-in warning mode is turned OFF and the alarm set off up to this point is stopped.

If determined that the human is not inside the vehicle 11 in step S23, the control portion 44 instructs the vehicle ECU 26 an alarm on mislaying of the portable device 12 inside the vehicle 11 through the bus 27. The vehicle 26 controls the bring-out alarm unit 24 according to the instruction, and the process proceeds to step S27.

In step S27, the bring-out alarm unit 24 sets off the alarm with respect to the mislaying of the portable device 12 inside the vehicle 11 according to the control of the vehicle ECU 26. For instance, the bring-out alarm unit 24 displays a message notifying the mislaying of the portable device 12 to the driver and the like on the liquid crystal display panel, and outputs the audio of the message from the speaker.

When the portable device 12 is inside the vehicle 11 but the human is not inside the vehicle 11, this means that the driver and the like got out of the vehicle 11 leaving the portable device 12 inside the vehicle 11. If the third person breaks in the vehicle 11 in such state, the third person can easily steal the vehicle 11, and thus an alarm with respect to mislaying of the portable device 12 is set off to prevent the vehicle 11 from being stolen.

For instance, when the alarm is set off with respect to the mislaying of the portable device 12 and the driver and the like returns to the vehicle 11, this is a state in which the portable device 12 and the human are inside the vehicle 11, and thus the alarm that is set off is stopped in step S26. In this case, the vehicle 11 is prevented from being stolen if the driver and the like move away from the vehicle 11 with the portable device 12 after stopping the engine 22.

Therefore, when the alarm is set off with respect to the mislaying of the portable device 12, the process thereafter proceeds to step S20, and the above-described processes are repeated.

The vehicle 11 specifies the position of the portable device 12 by performing a wireless communication with the portable device 12, and detects the human inside the vehicle 11 and appropriately sets off the alarm based on the specification result and the detection result.

Therefore, whether a state to set off the alarm can be more accurately specified by using the specification result on the position of the portable device 12 and the detection result on the human inside the vehicle 11. Therefore, the convenience of the vehicle 11 can be enhanced without affecting the safety (security) with respect to the stealing etc. of the vehicle 11.

In particular, the alarm is not set off when the vehicle 11 is in a safe state such as when the driver moves away from the vehicle 11 with the portable device 12 with the engine 22 running while the acquaintance of the driver is inside the vehicle 11, whereby the convenience of the vehicle 11 can be enhanced.

When the driver moves away from the vehicle 11 with the portable device 12 with a small child inside the vehicle 11, the child may mistakenly drive the vehicle 1. If the third person breaks-in when neither the portable device 12 nor the human is inside the vehicle 11, the third person may steal the vehicle 11. Thus, in order to enhance the safety of the vehicle 11, the gear of the vehicle 11 is locked so that the vehicle 11 cannot be driven when the portable device 12 is not inside the vehicle 11.

In such a case, if determined that the portable device 12 is not inside the vehicle 11 in step S16, the control portion 44 instructs the vehicle ECU 26 to lock the gear of the vehicle 11 through the bus 27. The vehicle ECU 26 controls the gear lock unit 23 according to the instruction to lock the gear so that the vehicle 11 cannot be driven. After the gear is locked by the gear lock unit 23, the process thereafter proceeds to step S17. In this case, if determined that the portable device 12 is inside the vehicle 11 in step S16, the gear of the vehicle 11 is unlocked by the gear lock unit 23 so that the vehicle 11 can be driven.

The convenience of the vehicle 11 can be enhanced, the vehicle 11 is prevented from being mistakenly moved or stolen, and the safety of the vehicle 11 can be enhanced by locking the gear when the portable device 12 is not inside the vehicle 11.

Figure 4:
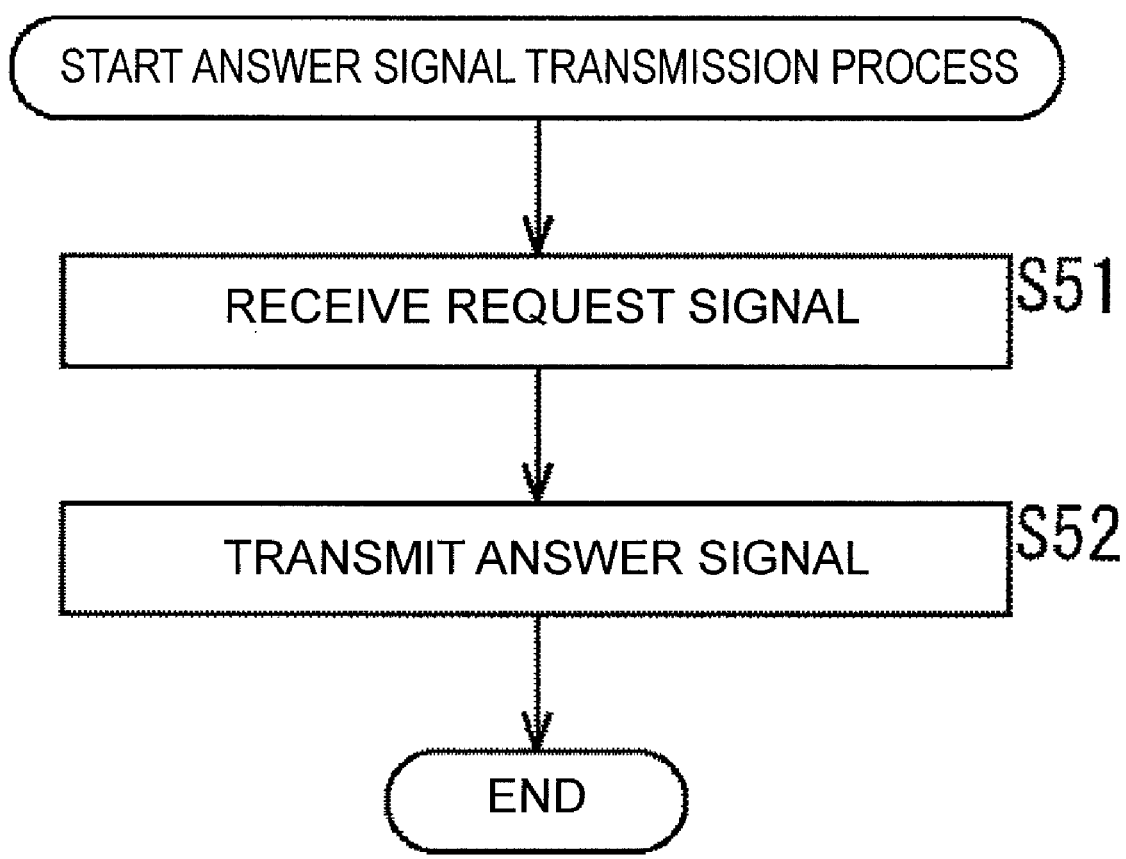
FIG. 4 is a flowchart describing an answer signal transmission process.

When the vehicle 11 transmits the request signal to specify the position of the portable device 12, the portable device 12 inside the vehicle 11 receives the request signal and performs an answer signal transmission process of transmitting the answer signal in response to the request signal. The answer signal transmission process by the portable device 12 will be described with reference to the flowchart of FIG. 4.

In step S51, the reception unit 61 receives the request signal transmitted from the transmission unit 30 of the vehicle 11, and provides the same to the reception control unit 62. The reception control unit 62 demodulates the request signal provided from the reception unit 61, and provides the same to the ECU 63.

The ECU 63 transmits the answer signal in response to the request signal provided from the reception control unit 62. In other words, the ECU 63 reads out the vehicle ID from the memory 64 and provides the same to the transmission control unit 65, and instructs the transmission control unit 65 to transmit the answer signal to the transmission control unit 65. The transmission control unit 65 modulates the carrier wave based on the vehicle ID provided from the ECU 63, and provides the resultant signal to the transmission unit 66 as the answer signal.

In step S52, the transmission unit 66 transmits the answer signal provided from the transmission control unit 65, and the answer signal transmission process is terminated.

The portable device 12 transmits the answer signal in response to the request signal when receiving the request signal from the vehicle 11 in such manner. The vehicle 11 then can reliably specify the portable device 12 inside the vehicle 11.

Therefore, according to the wireless communication system including the vehicle 11 and the portable device 12, an alarm is set off with respect to the bring-out etc. of the portable device 12 based on whether or not the portable device 12 is inside the vehicle 11 and whether or not the human is inside the vehicle 11, whereby the alarm is more appropriately set off and the convenience of the vehicle 11 can be enhanced.

Embodiments of the present invention are not limited to the above-described embodiments, and various modifications may be made within a scope not deviating from the content of the present invention.

What is claimed is:

1. An information processing system comprising:
    an information processing device arranged in a vehicle;
    a portable device storing unique information;
    a specification information recording unit configured to record specification information having a predetermined relationship with the unique information;
    a first transmission unit configured to transmit a request signal requesting transmission of the unique information;
    a first reception unit configured to receive the unique information transmitted from the portable device;
    a position specifying unit configured to compare the received unique information with the specification information and specify whether or not the portable device is inside the vehicle;
    a detection unit configured to detect a human inside the vehicle;
    an alarm unit configured to set off an alarm; and
    an alarm control unit configured to control the alarm unit so that the alarm is set off when the portable device is not inside the vehicle and the human is not detected inside the vehicle and the alarm is not set off when the human is continuously detected inside the vehicle from when specified that the portable device is not inside the vehicle, wherein
    the portable device comprises:
        a unique information recording unit for recording the unique information;

a second reception unit for receiving the request signal from the information processing device; and a second transmission unit for transmitting the unique information recorded in the unique information recording unit in response to the request signal.

2. The information processing system according to claim 1, wherein the alarm control unit controls the alarm unit so that the alarm is set off when specified that the portable device is inside the vehicle and the human is not detected inside the vehicle.

3. The information processing system according to claim 1, wherein the information processing device further comprises a gear lock unit configured to lock a gear of the vehicle when specified that the portable device is not inside the vehicle.

4. The information processing system according to claim 1, wherein the information processing device performs a process of monitoring bring-out of the portable device to the outside of the vehicle and setting of the alarm while an engine of the vehicle is running.

5. An information processing device arranged in a vehicle, the information processing device comprising:
    a specification information recording unit configured to record specification information having a predetermined relationship with unique information recorded in a portable device;
    a transmission unit configured to transmit a request signal requesting transmission of the unique information;
    a reception unit configured to receive the unique information transmitted from the portable device in response to the request signal;
    a position specifying unit configured to compare the received unique information with the specification information and specify whether or not the portable device is inside the vehicle;
    a detection unit configured to detect a human inside the vehicle;
    an alarm unit configured to set off an alarm; and
    an alarm control unit configured to control the alarm unit so that the alarm is set off when the portable device is not inside the vehicle and the human is not detected inside the vehicle and the alarm is not set off when the human is continuously detected inside the vehicle from when specified that the portable device is not inside the vehicle.

6. An information processing method of an information processing device arranged in a vehicle, the method comprising:
    recording specification information having a predetermined relationship with unique information recorded in a portable device;
    transmitting a request signal requesting transmission of the unique information;
    receiving the unique information transmitted from the portable device in response to the request signal;
    comparing the received unique information with the specification information and specifying whether or not the portable device is inside the vehicle;
    detecting a human inside the vehicle; and
    controlling an alarm so that the alarm is set off when the portable device is not inside the vehicle and the human is not detected inside the vehicle and the alarm is not set off when the human is continuously detected inside the vehicle from when specified that the portable device is not inside the vehicle.

7. The information processing system according to claim 1, wherein the alarm control unit controls the alarm unit so that a second alarm is set off when specified that the portable device is inside the vehicle and the human is not detected inside the vehicle.

8. The information processing device according to claim 5, wherein the alarm control unit controls the alarm unit so that a second alarm is set off when specified that the portable device is inside the vehicle and the human is not detected inside the vehicle.

9. The information processing device according to claim 5, wherein the alarm control unit controls the alarm unit so that the alarm is set off when specified that the portable device is inside the vehicle and the human is not detected inside the vehicle.

10. The information processing method according to claim 6, wherein a second alarm is set off when specified that the portable device is inside the vehicle and the human is not detected inside the vehicle.

11. The information processing method according to claim 6, wherein the alarm is set off when specified that the portable device is inside the vehicle and the human is not detected inside the vehicle.

* * * * *